United States Patent [19]

Sugino

[11] Patent Number: 4,611,913
[45] Date of Patent: Sep. 16, 1986

[54] METHOD AND APPARATUS FOR ANALYZING OPHTHALMIC ELEMENTS AND THE LIKE

[76] Inventor: Paul S. Sugino, 4808 Cameo Dr., Santa Maria, Calif. 93455

[21] Appl. No.: 369,739

[22] Filed: Apr. 19, 1982

[51] Int. Cl.$^4$ .............................................. G01B 9/00
[52] U.S. Cl. .................................... 356/127; 356/125
[58] Field of Search ............... 356/124, 125, 127, 126; 351/211, 241

[56] References Cited

U.S. PATENT DOCUMENTS

| | | | |
|---|---|---|---|
| 1,510,114 | 9/1924 | Thorner | 351/211 |
| 3,486,825 | 12/1969 | Howland | 356/124 |
| 4,275,964 | 6/1981 | Vassiliadis | 356/127 |

FOREIGN PATENT DOCUMENTS

| | | | |
|---|---|---|---|
| 2159820 | 6/1972 | Fed. Rep. of Germany | 356/125 |
| 168529 | 12/1981 | Japan | 356/124 |

*Primary Examiner*—R. A. Rosenberger
*Attorney, Agent, or Firm*—Charlton M. Lewis

[57] ABSTRACT

The disclosure concerns the determination of the ophthalmic parameters of a thin astigmatic optical element without requiring initial location of its cylindrical axis. The effective optical power of the eye or other element is measured in three mutually spaced meridians that are selected without regard for the cylindrical axis. The ophthalmic parameters of the element, typically the spherical power, the cylindrical power and the cylindrical axis, are then derived from the measured powers and their selected meridian angles. The power of an astigmatic element in a selected meridian intermediate the principal meridians may be determined in generally conventional manner by adjusting a test optical system to produce a sharp image of a suitable target, preferably with limitation of the image-forming light to rays that traverse the element close to the selected meridian. Also disclosed is a method of establishing correct focus of such a test system in terms of the lateral magnification of the target image rather than its sharpness. For that purpose the test system is typically of Badal type with effective aperture stop axially spaced from the element under test.

16 Claims, 7 Drawing Figures

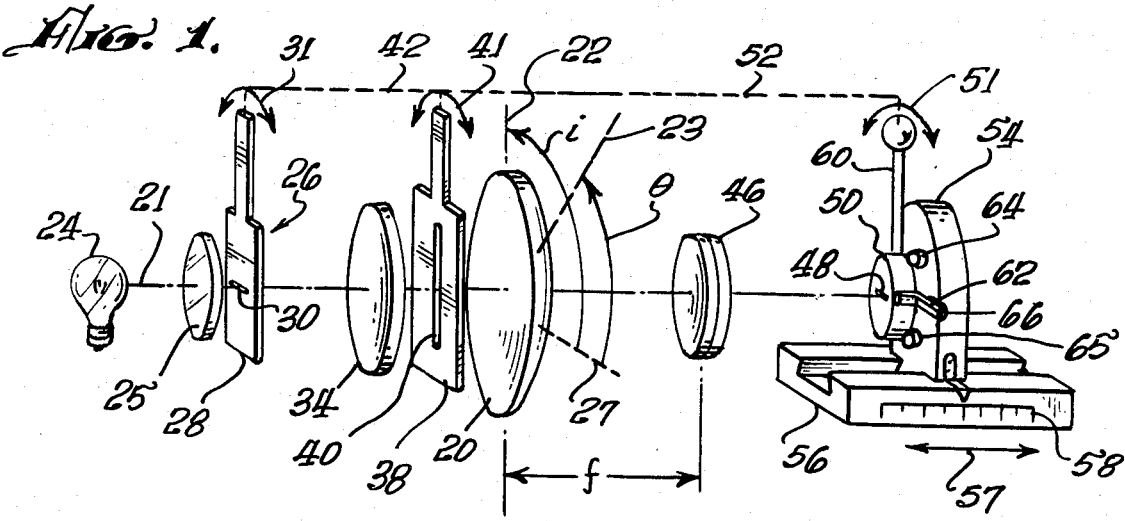
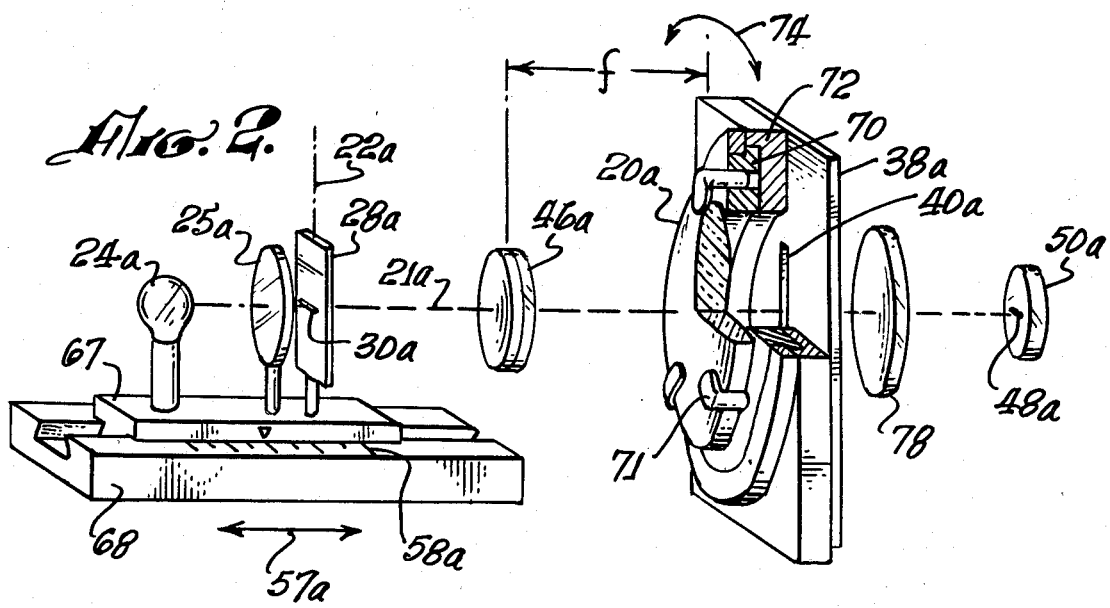
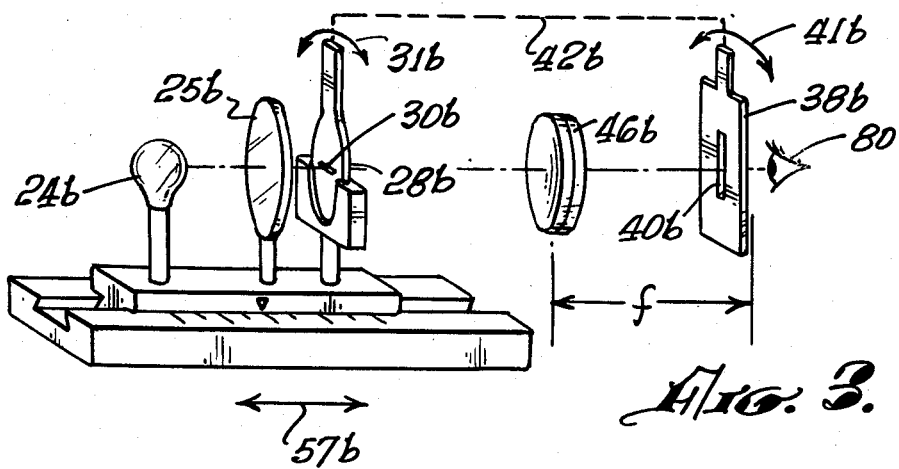

METHOD AND APPARATUS FOR ANALYZING OPHTHALMIC ELEMENTS AND THE LIKE

BACKGROUND OF THE INVENTION

This invention provides a new approach to the problem of determining the focal parameters of optical elements or systems of the general type encountered in ophthalmic optics. Those parameters typically comprise the spherical power, the cylindrical power and the cylindrical axis or principal meridian.

In its more general aspects, the invention is useful for analyzing any optical system that may have appreciable cylindrical power and that is sufficiently compact axially to be usefully represented by a thin-lens approximation. In the particular field of ophthalmic optics the system under test may comprise the human eye itself or the lens or lens system by which errors of the eye are to be corrected.

Presently available procedures for measuring the focal parameters of such lens system are of two basic kinds. In one kind, a principal meridian is first determined, as by finding the meridian in which a linear target appears sharp. The focal power is measured in any suitable manner in that meridian and also in the second principal meridian, usually assumed to be at 90° to the first. One of the resulting values represents the spherical power of the system, and their difference represents the cylindrical power.

Such prior art procedures have the disadvantage that the initial determination of a principal meridian tends to be time consuming and subject to appreciable error, especially when the cylindrical power is relatively small. Those difficulties are well described in the prior U.S. Pat. Nos. 3,785,723 and 3,841,760 to David L. Guyton, for example, together with special targets and associated procedures for aiding the operation.

In another kind of procedure for determining the ophthalmic parameters, a laser beam is nutated about the axis of a radially spoked target or reticle, which is then imaged by the optics under test. The imaging beam is sensed electronically and the signal is processed to compute the desired parameters, typically by taking the Fourier transform of the time domain signal and determining the frequency content by various applicable algorithms. Since that approach requires relatively sophisticated apparatus it is mainly adapted for fully automatic determination of the parameter values.

The present invention aims to solve the focusing problem in the time domain, avoiding any Fourier or like transformation and the accompanying technical uncertainties. At the same time, the invention retains the basic simplicity of the more conventional prior art, but avoids its primary problem by completely eliminating any initial step of locating a principal meridian of the system under test.

SUMMARY OF THE INVENTION

The invention can be viewed as being made possible by combining two concepts, neither of which appears to have been used previously for any such purpose.

In contrast to the overwhelming tendency of the prior art, it has been found feasible to measure the effective focal power of a toric or astigmatic lens in any desired meridian, including meridians that are oblique to the two principal meridians defined by the axis of the cylindrical power. A unique and significant value of focal power in such an intermediate meridian can be obtained in a number of ways. For example, a linear target perpendicular to the selected meridian plane may be imaged by means of light that is limited to rays traversing the test lens substantially in the meridian plane. Such limitation of the effective light rays can be obtained, for example, by mounting on the optical axis at or near the lens an opaque diaphragm having a narrow diametral slit parallel to the selected meridian. The sharpness of the resulting image has been found to correspond generally to that of a conventionally formed image of a linear target normal to one of the principal meridians. Hence the effective power of the lens can be obtained for an intermediate meridian by measuring the axial positions of a linear target and its image in much the usual way except for addition of a suitably placed and oriented light-limiting diaphragm.

A second concept utilized by the invention is derived from the well-known formula which expresses the theoretical focal power $P_i$ for such an intermediate meridian angle $i$ in terms of the corresponding spherical and cylindrical powers $P_s$ and $P_c$, respectively, of the astigmatic lens or lens system. That formula is $$P_i = P_s + P_c \sin^2(i - \theta) \tag{1}$$

where $\theta$ is the angle of the cylindrical axis.

In accordance with the present invention, the optical parameters of the lens under test are determined by measuring the effective power of the lens in three distinct meridians, selected without regard for the principal meridians of the lens, but forming definite, predetermined angles with each other. The focal parameters $P_s$, $P_c$ and $\theta$ are then derived from the three measured powers and their corresponding meridian angles $i$, $j$ and $k$, say, using equation (1) for meridian $i$ and the two similar equations for the other two selected meridians $j$ and $k$.

In fact, it has been found that the focal parameters can be expressed explicitly as functions of three such measured powers and the corresponding meridian angles. In one illustrative form, those functions may be written:

$$P_s = P_i - P_c \sin^2(i - \theta) \tag{2}$$

$$P_c = \frac{\sqrt{(U - V)^2 + W^2}}{\tan(j + i) - \tan(k + j)}$$

$$\theta = \tfrac{1}{2} \tan^{-1} \frac{W}{U - V}$$

where U, V and W represent the expressions:

$$U = \frac{2(P_j - P_i)}{\sin 2j - \sin 2i} \tag{3}$$

$$V = \frac{2(P_k - P_j)}{\sin 2k - \sin 2j}$$

$$W = U \cdot \tan(i + k) - V \cdot \tan(i + j)$$

and the sign of $P_c$ is taken as the product of the sign of $\theta$ times the sign of $(P_i + P_j - 2P_k)$.

It is generally preferred to select test meridian angles $i$, $j$ and $k$ that are mutually spaced by uniform angular intervals of 60°. That selection can be shown to minimize the effects on the resulting parameter values of small random errors of measurement of the observed powers. Uniform spacing of the test meridians also tends to make the overall precision of the resulting parameters less dependent upon the angular relation between the selected set of meridians and the cylindrical axis of the test lens.

Once a definite set of meridian angles has been selected, expressions such as (2) can be considerably simplified. For example, for meridians at the specific angles:

$$I = -60° \quad j = 0° \quad k = +60° \tag{4}$$

the ophthalmic parameters may be expressed in the illustrative form:

$$P_s = P_i - P_c \sin^2(\theta + 60°) \tag{5}$$

$$P_c = \tfrac{2}{3}\sqrt{3A^2 + B^2}$$

$$\theta = \tfrac{1}{2}\tan^{-1}\frac{3A}{B}$$

where $$A = P_i + P_k \tag{6}$$

$$B = 2P_j - A$$

For either form of calculation, development of a computer program for performing the indicated substitutions is obviously entirely straightforward. For example, the Texas Instruments programmable calculator Model 58 or 59 has sufficient storage capacity and can be programmed to compute the three ophthalmic parameters of a test lens in direct response to input of three values of the effective lens power observed at the respective meridian angles (4).

The invention further includes a preferred method for determining the effective power of an astigmatic test lens in a selected intermediate meridian. In that method correct focus of the astigmatic test system is determined in terms of image size rather than image sharpness. Since image size, for a suitable target configuration, can be accurately observed even in presence of skew rays typical of astigmatic images, the above described elimination of skew rays is not necessary in the preset method.

The method employs a suitably designed lens configuration that includes the test lens and has the special property of imaging a target at a lateral magnification that is independent of the power of the test lens. That property is present, for example, in the well known Badal lens configuration. In that illustrative configuration an objective lens is mounted on one side of the test lens with its focal plane at the test lens. On the other side of the test lens the target (or its image) is positioned optically at infinity, as by a collimator lens. In addition to forming an image at constant magnification, such a test system is known to have the further useful property, when correctly focused, that the axial distance from the objective to the image (or its target) is a linear measure of the power of the test lens.

The present aspect of the invention preferably uses target structure clearly defining a definite dimension parallel to the selected meridian plane. Such a target may, for example comprise two distinct target components spaced from each other on opposite sides of the optical axis. When that target is imaged by a Badel configuration arranged to have its effective aperture stop well spaced from the test lens, the apparent separation of the two image components alters proportionally in response to variations of the focal condition. Correct focus occurs when the image dimension corresponds to the predetermined correct, or "critical," value of the magnification.

In presence of astigmatism of the test lens, the image of a target component of point form, say, will appear in general as an ellipse, forming a sharp line only if the selected meridian happens to coincide with a principal meridian of the test lens. However, at correct focus, the separation of two such component images can be determined with good accuracy, as by setting visually or automatically on the centroid of each image. Hence the power of the test lens in any selected meridian can be established in tersm of the position of best focus independently of any criterion of image sharpness. Such a method is clearly useful in design of an automatic apparatus for finding the ophthalmic parameters, and has been found also to give improved results in a subjective lens meter.

For many purposes it is sufficient to determine the position for correct focus, but actual attainment of such position is not necessary. The correct focal condition can then be determined, for example, by linear regression from measurements of the image size at two (or more) predetermined focal positions, preferably selected to represent magnifications that embrace the "correct" value. The so computed correct focal condition yields a unique and accurate value for the test lens power in the selected meridian.

That method of measuring lens power in an intermediate meridian is especially convenient when power values in several different intermediate meridians are required, as for determining the three focal parameters of a lens or lens system. For that purpose the target preferably includes distinct components defining test dimensions parallel to the three selected meridians. For uniformly spaced meridians, such a target typically comprises six components such as dots symmetrically placed at the corners of a hexigon, defining three equal dimensions along respective diameters. The image of such a target may be received by a planar array of photo-responsive elements, typically of conventional type, for supplying respective inputs to an electronic digital computer. With suitable sampling and summing techniques of known type, the mean position of each image component along its diameter is readily computed, yielding a value for the image magnification on each diameter. If two such sets of magnification values are derived with the image receiving surface at different focal positions, a simple proportion between the two values for each diameter yields the position of correct focus, and hence the apparent lens power for each meridian. That procedure is capable of great speed in operation, since only two focal positions are ordinarily involved and all data are obtained and processed electronically.

BRIEF DESCRIPTION OF THE DRAWINGS

A full understanding of the invention, and of its further objects and advantages, will be had from the following description of illustrative apparatus and procedures for carrying it out. The particulars of that description, and of the accompanying drawings which form a part of it, are intended only as illustration, and not as a limitation upon the scope of the invention, which is defined in the appended claims. In the drawings:

FIG. 1 is a schematic drawing representing an illustrative optical system for analyzing an astigmatic test lens in accordance with the invention;

FIG. 2 is a schematic drawing representing a modification;

FIG. 3 is a schematic drawing illustrating a further aspect of the invention;

DESCRIPTION OF PREFERRED EMBODIMENTS

Figure 4:
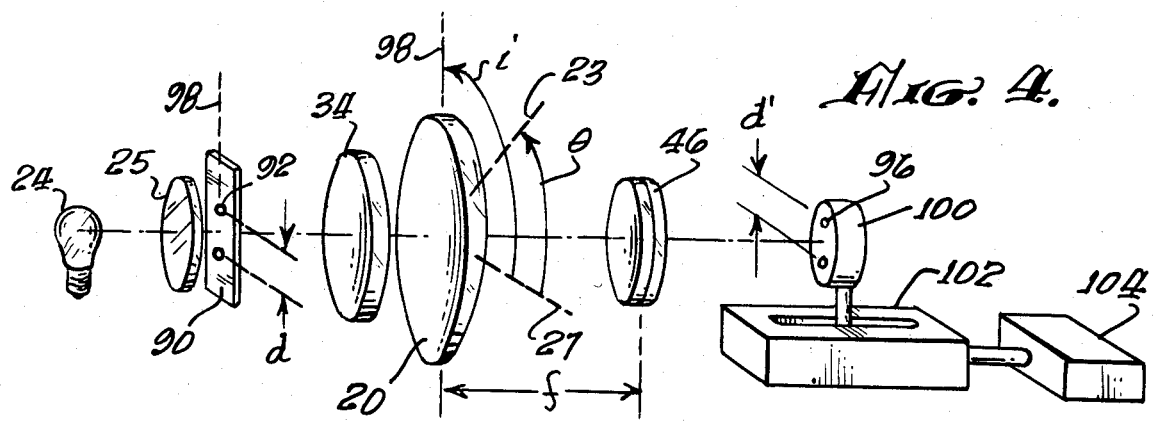
FIG. 4 is a schematic drawing representing an illustrative system for carrying out a further aspect of the invention.

FIG. 1 represents schematically an apparatus in accordance with one aspect of the invention for determining the effective power of the astigmatic test lens 20 in any selected meridian with respect to the optical axis 21. The selected meridian plane is assumed for clarity of illustration to be vertical, as indicated by the line 22. If the horizontal direction of line 27 is taken as zero angle, the angle i of the selected meridian is then 90°. The cylindrical axis of test lens 20 is typically unknown initially, but is indicated for clarity by the line 23 at the angle $\theta$, forming an illustrative oblique angle $i-\theta$ with selected meridian plane 22.

The target or reticle 26 is illuminated by any suitable means, shown as the light source 24 and the diffuser element 25. Target 26 is designed to discriminate focal condition of the system in selected meridian plane 22. Such a target typically comprises a line or a pattern of parallel lines extending perpendicular to the selected meridian, and is represented in FIG. 1 by the single horizontal slit 30 in the diaphragm 28. The entire diaphragm is typically mounted, by means not explicitly shown, for rotational adjustment about optical axis 21, as indicated by the arrow 31. That movement permits variation of the orientation of slit 30 to make the linear target pattern perpendicular to any selected meridian. The light beam from target slit 30 is collimated by the collimator lens 34, placing the target optically at infinity as seen by the test lens, which may be mounted at any convenient distance from the collimator.

In the system of FIG. 1 the light effectively transmitted by the test lens is limited to those rays of the incident beam that traverses the lens substantially in the selected meridian plane. The limitation is typically provided by suitable diaphragm means, shown as the single diaphragm 38 containing the diametral defining slot 40 which is oriented in meridian plane 22. Diaphragm 38 is preferably positioned closely adjacent test lens 20, the axial spacing in FIG. 1 being exaggerated for clarity of illustraion. The diaphragm may be mounted on either side of the lens. Like target diaphragm 28, it is typically mounted for rotational adjustment about the optical axis, as indicated by the arrow 41, to correspond to any selected meridian plane. The two diaphragms 26 and 38 are preferably coupled together for simultaneous rotation, as indicated schematically by the broken line 42. If preferred, the defining diaphragm means may comprise two diaphragms, one on each side of the test lens, with similar slits mutually aligned.

The ribbon of light transmitted by test lens 20 under control of defining slit means 40 expands progressively into a beam of generally elliptical section, the exact form of which depends upon the optical parameters of the test lens. If that lens is positive, for example, the system as so far described will form a real image of target slit 30 at a distance from the test lens equal to its effective focal length in the selected meridian 22. The position of such an image may be measured in any suitable manner, and can provide a measure of the lens power that is useful for many purposes for which a linear representation of lens power is not required.

It is generally preferred to supplement the test lens in known manner with an objective lens 46 having its anterior focal point at test lens 20. The resulting Badal configuration of test lens and objective then typically forms a real image of target slit 30, indicated at 48. That image is received by a suitable receiving device 50, which is typically mounted on the support 54 for axial movement to optimize lateral sharpness of the image. Such movements may be provided, for example, by sliding of the support 54 along the guideway 56, as indicated by the arrow 57. The mounting of image receiver 50 on support 54 typically provides in known manner for rotational adjustment about optical axis 21, as indicated by the arrows 51, to align the direction of its response with the selected meridian 22. That rotational adjustment is preferably coupled to those of target slit 30 and defining slit 40, as indicated by the broken line 52, in proper phase relation to insure that all three elements are correctly oriented for any selected meridian.

For subjective evaluation of the focal condition, image receiver 50 typically comprises a conventional eyepiece, which may have a suitably oriented reticle in its focal plane, if desired, for comparison with image 48. For objective evaluation, receiver 50 may comprise a linear array of photosesitive transducers of known construction, extending perpendicular to linear image 48 and having signal outputs to electronic circuitry for indicating the focal condition of that image. Such circuitry may include automatic means of conventional type for driving support 54 to the axial position of optimum image sharpness.

When correctly focused, target image 48 is spaced from the posterior focal point of objective 46 by a distance which is directly proportional in absolute magnitude to the power of the test lens, and which indicates by its direction the polarity of that power. The information output from the system may be of any type that is linearly responsive to that axial position of the effective plane of image receiver 50. Such output means are shown schematically in FIG. 1 as the visual scale 58. With proper calibration such a scale may indicate directly the effective power of test lens 20 in the selected meridian. In a practical system, output means 58 may typically include electrical means of known type for developing digital code signals representing directly the test lens power that corresponds to the instant axial position of the image receiver.

In operation of the described illustrative system, defining slit 40 performs the novel function of limiting the light reaching target image 48 to rays that traverse test lens 20 substantially in a selected meridian plane oblique to the cylinder axis of the lens. By thus eliminating rays that do not traverse the test lens close to the selected meridian plane, the slit stops those skew rays that would most severely blur the central portion of the target image. Since such blurring is essentially a second order effect, even a fairly wide slit can perform that function effectively, permitting the image to be focused in an oblique meridian substantially as critically as is normally possible in a principal meridian of the test lens. In any case, defining slit 40 is made wide enough to provide ample illumination of the target image and to avoid any significant diffraction effects at the slit.

The length of defining slit 40 may be considered to determine the effective relative aperture of the system in the selected meridian plane. Hence, the greater that slit length, the more critically the image sharpness depends upon the focal adjustment, facilitating such adjustment whether performed visually and subjectively or by automatic mechanism.

The apparatus of FIG. 1, as so far described, is useful generally for determining the effective power of any test lens 20 in a selected meridian that may be oblique to the principal meridians of the lens. If such an apparatus is to be used further for determining the ophthalmic parameters of the test lens, means are preferably provided for shifting the orientation of the selected meridian from one to another of three definite predetermined meridians relative to a single test lens. The effective power of the test lens is then determined for each of those predetermined meridians, and the resulting values are used for deriving the required parameters, typically the spherical power, the cylindrical power and the cylindrical axis.

For that purpose suitable drive means, shown schematically in FIG. 1 as the handle 60, are coupled to linkage 42, 52 for rotating the three elements 28, 38 and 50 in unison; and retaining mechanism is provided for releasably retaining the mechanism at each of the selected angles. For example, a resilient detent may be provided between image receiver 50 and support 54 at each of the selected angles; or, as shown illustratively, the radial arm 62 on member 50 may engage the positive stops 64 and 65 mounted on support 54 at the two extreme angles selected, and may resiliently engage the detent notch 66 at the selected intermediate angle.

An alternative arrangement for shifting the selected meridian angle comprises means for mounting the diaphragms 28 and 38 and the image receiver 50 in fixed orientations at the relative angles already described for defining a meridian plane, and means for rotating test lens 20 about the optical axis to alter its relation to that fixed meridian. Such an arrangement has the advantage that only a single element need be rotatable about the optical axis, and no element needs to move axially and in rotation.

It is sometimes necessary for the image receiver to remain axially fixed. Under that condition the system is typically focused by movement of the target rather than of the surface on which the image is received. FIG. 2 represents such a system, and also illustrates the alternative arrangement described above in which selected angular relationships between the meridian plane and the test lens are obtained by rotating the test lens rather than the meridian.

As typically shown in FIG. 2, the light source 24a, the diffuser 25a and the target diaphragm 28a are fixedly mounted on the support 67. The orientation of the linear target pattern 30a defines a stationary meridian plane 22a shown typically as vertical. As indicated by the arrow 57a, target support 67 is slidable along the guideway 68 parallel to optical axis 21a, with its position indicated by the scale 58a. The test lens 20a is mounted on the ring 70 by means indicated as the pins 71, which may represent a conventional cross-slide mechanism for centering the lens on axis 21a. Ring 70 is rotatably adjustable (arrow 74) on support plate 72, typically with suitable means, not explicitly shown, for defining three selected angular positions. The light defining diaphragm 38a carrying slit 40a is mounted closely adjacent the test lens, typically in fixed position on support plate 72.

As in FIG. 1, the objective lens in FIG. 2, shown at 46a, is mounted between the test lens and the axially movable member, and one of the focal points of the objective is positioned substantially at the test lens. The image receiver 50a is typically mounted fixedly at the posterior focal point of the auxiliary lens 46a. That lens may be mounted at any convenient distance behind test lens 20a and performs, with respect to the image 48a, a function essentially the inverse of that performed in FIG. 1 by collimator 34 with respect to target 30.

As before, image receiver 50a may represent, for example, an eyepiece for subjective evaluation of the focal condition, or automatic means of any suitable type for sensing the focus and driving target support 67 to correct any focal error.

In operation of the system of FIG. 2, image 48a will appear sharp in the selected meridian plane only if the critical image-forming rays have been rendered parallel by the combined action of objective 46a and test lens 20a. Hence, if the test lens power in the selected meridian should be zero, a sharp image indicates that target slit 30a is at the anterior focus of objective 46a, establishing zero position of scale 58a. For other scale positions, sharp focus indicates that rays leaving the target are rendered just sufficiently convergent or divergent by the objective lens to counteract the test lens power. In the manner already described, defining slit 40a enables the system to produce at 48a an image of the linear target pattern that is sharp in the selected meridian regardless of the orientation of the cylindrical axis of the test lens.

FIG. 3 illustrates a further aspect of the present invention whereby the ophthalmic parameters of the optical erorrs of the human eye may be determined without requiring an initial step of finding the cylinder axis of the refractive error. A close relationship between the system of FIG. 3 and that of FIG. 2 may be seen by considering that the power of the normal emmetropic eye in FIG. 3 corresponds to that of auxiliary lens 78 in FIG. 2, and that the refractive error, if any, of the eye corresponds to the unknown power of test lens 20a in FIG. 2. It is permissible to consider the test lens and auxiliary lens to be superposed since their spacing in FIG. 2 is arbitrary.

In FIG. 3 the target diaphragm 28b and its illuminating system 24b and 25b are mounted for axial adjustment 57b for focusing the system, as in FIG. 2. However, the target diaphragm and its pattern 30b are also rotationally adjustable about the optical axis 21b, as indicated by the arrow 31b. The eye 80 to be analyzed is positioned, as by a head rest of conventional type, not explicitly shown, at the posterior focal point of the objective lens 46b. That lens is mounted with its anterior focal point within the range of axial movement of target 30b. A defining slit 40b, corresponding functionally to slits 40 and 40a of the previous figures, is mounted in diaphragm 38b in axial position closely adjacent the eye and with capability for rotational adjustment as indicated by the arrow 41b. That rotational adjustment is preferably coupled to that of target diaphragm 28b, as indicated by the dashed line 42b; however, that coupling mechanism does not affect the axial focusing movement of the target. The coupled rotational movements of the target and the defining slit are retained by suitable stop or detent mechanism, typically similar to that indicatd in FIG. 1, at three alternative angles, defining the three selected meridians in which the refractive error of the eye is to be measured.

In operation of the system of FIG. 3, the two diaphragms 28b and 38b are set successively to the three selected meridian angles. At each angle the focus is adjusted at 57b, typically under subjective control of the patient, to determine the position of optimum lateral sharpness of the visual image of target slit 30b. The effective power of the refractive error of the eye is typically read off for each meridian from a suitably calibrated scale or other output means associated with movement 57b. All of those actions are carried out without requiring knowledge of the axis of the cylindrical error of the eye, if any. The parameters of the eye error, including the cylindrical axis, are then derived from the three measured powers, taking account of the selected meridian angles.

The system of FIG. 3 can be modified if desired to permit external observation of the image on the retina of eye 80, as by inserting an oblique, partially reflecting mirror between objective 46b and diaphragm 40b. The image so extracted may be observed directly by the technician, who can then monitor or replace the patient's subjective judgment in focusing the system; or the extracted image may be scanned electronically in known manner to produce a signal representing image sharpness for automatically controlling the focusing drive.

FIG. 4 represents in schematic form a system for carrying out the further aspect of the invention whereby correct focal condition is judged in terms of image magnification rather than image sharpness. The lens to be analyzed is represented at 20, with cylindrical axis 23 at the typical angle $\theta$ from the assumed zero angular position 27. The target 90 with target pattern 92 is illuminated by light source 24 and diffuser 25, and is projected optically to infinity by collimating lens 34. The objective lens 46 is mounted with its anterior focal plane substantially coinciding with test lens 20, forming with the latter a Badal configuration having the properties already described. A target image 96 is formed by that lens configuration and is received by the image receiving means 100, which is movable axially relative to the fixed support 102 by conventional drive means indicated schematically at 104.

Target pattern 92 of FIG. 4 typically comprises two distinct target components which are mutually spaced by a definite distance d in a selected meridian plane 98, shown as vertical. Each of those components is preferably symmetrical with respect to a line perpendicular to that meridian, and may comprise such a line, a point source, or a suitably oriented ellipse, for example. The separation d' of the corresponding components of target image 96 can then be accurately measured even though each component may be somewhat blurred due to imperfect focus or due to the astigmatism of the test lens.

From the elementary laws of physics the lateral magnification M for the Badal lens configuration of FIG. 4 can be shown to equal $-P_1/P_3$, where $P_1$ and $P_3$ represent the optical powers of collimator lens 34 and objective lens 46, respectively. Therefore, for any correctly focused test system of the type shown, d' assumes a definite critical value $d'_o = Md$, which value is independent of the power $P_2$ of the test lens. Hence, if d' is observed to have that critical value $d'_o$, correct focus is indicated.

However, that criterion for correct focus becomes impractical if the effective aperture stop for the system is located at the test lens. Under that condition the principal ray of the beam that forms each image component is parallel to the optical axis. The value of d' then remains constant at the above critical value $d'_o$ as the image is de-focused. That difficulty can be avoided by providing in the optical system an aperture stop spaced axially from the test lens. For example, the elements of FIG. 4 may be so dimensioned that an element other than the test lens acts as effective aperture stop for the system, or an aperture-limiting diaphragm may be inserted at a selected point in the system.

Figure 5:
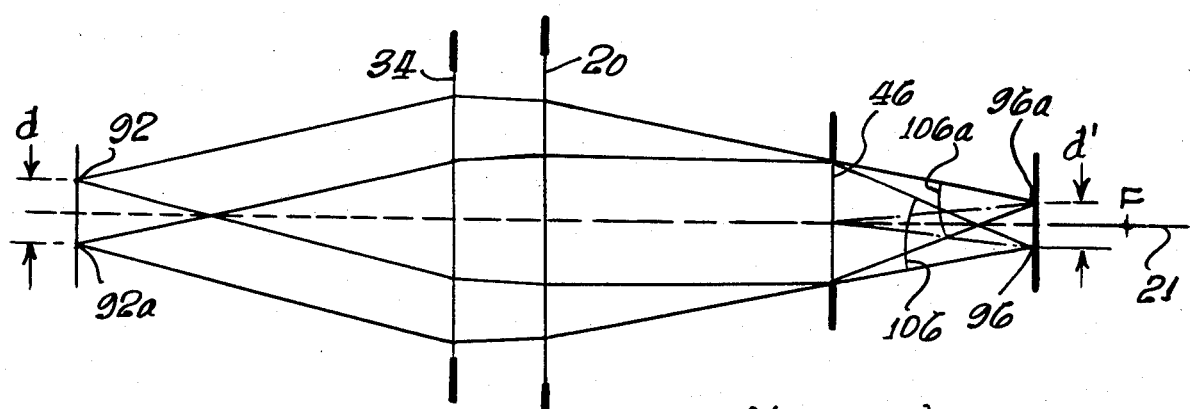
FIG. 5 is a schematic ray diagram corresponding generally to the system of FIG. 4.

FIG. 5 is a schematic ray diagram in the plane of two target components 92 and 92a of point form and their respective images 96 and 96a, illustrating the generally preferred condition that objective lens 46 acts as aperture stop. In view of the appreciable divergence of the beams 106 and 106a that form the two image components, any axial variation of the plane in which the image is observed will cause a proportional change in the separation of the centroids of the two image components, and hence of the observed magnification.

More particularly, the image of a target component of simple point form is in general an ellipse with principal axis parallel and perpendicular to the cylindrical axis 23 of the test lens, and with a shape dependent upon the plane in which the image is viewed. In a focal plane corresponding to either principal focus of the test lens, the ellipse becomes a sharp line segment, which is perpendicular to the cylindrical axis for the focal plane corresponding to the spherical power and is parallel to the cylindrical axis for the focal plane corresponding to the sum of the spherical and cylindrical powers. At some intermediate plane the image is circular. The point of present importance is that such an image, to a first order approximation, remains essentially symmetrical about its centroid, so that in any focal plane the x and y coordinates of the centroid provide a valid definition for the position of the principal ray, and hence of the image itself. That remains true even for coordinates that are oblique with relation to the principal axes of the elliptical image. The x and y coordinates of an image centroid can be computed in known manner from output signals produced by conventional scanning means responsive to the light distribution at a particular image plane. The separation d' of the two image components is then directly obtainable from the x and y coordinates of the two component centroids, or from a single coordinate if it is oriented parallel to the selected meridian plane.

Figure 6A:
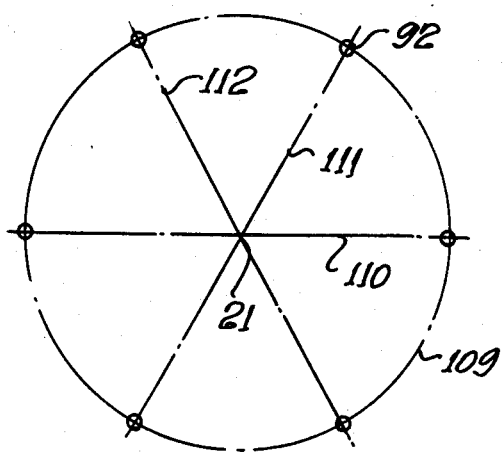
FIG. 6A is a schematic drawing representing an illustrative target pattern.

FIG. 6A illustrates a preferred general form of target for determining the optical parameters of a test lens by measurements of lateral magnification in three meridians selected without regard for the cylindrical axis of the test lens. That target comprises six components 92 arranged on a coaxial circle 109 and at the corners of a regular hexagon, providing three component pairs in uniformly spaced meridians 110, 111 and 112. Each component is typically a conventional light emitting diode, facilitating the sequential illumination of the respective pairs of diametrically opposite components, as by straightforward switching circuitry.

Figure 6B:
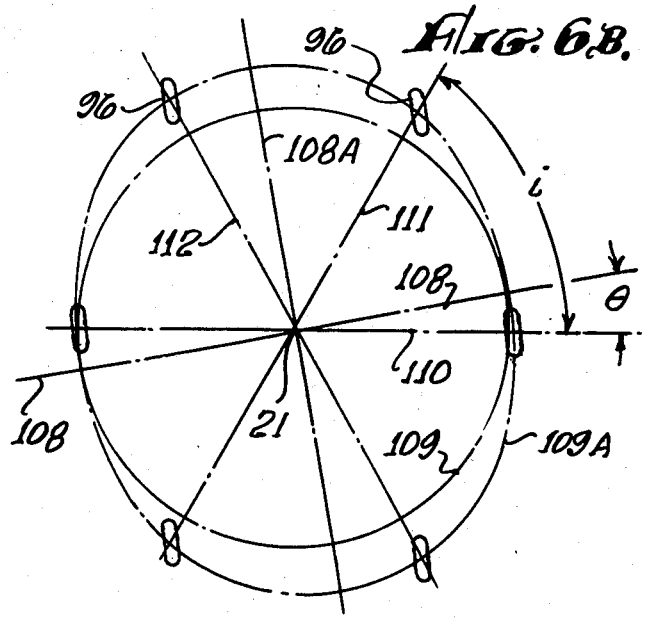
FIG. 6B is a schematic drawing representing a typical image of the target of FIG. 6A.

Typical appearance of the corresponding image is illustrated schematically and only qualitatively in FIG. 6B, assuming a system magnification of unity. The figure assumes a test lens having positive spherical power as in FIG. 5, and also having a negative cylindrical component. The cylindrical axis is assumed to form an angle $\theta = 10°$ with meridian plane 110, as indicated by the line 108. The image receiving surface is positioned for illustration at the focal plane for rays in the meridian plane that includes that cylindrical axis, which rays are subject only to the spherical power of the test lens. Hence each image component 96 is sharply focused in that meridian and has a width equal to the diameter of a target component 92 (FIG. 6A). On the other hand, in the meridian plane 108A perpendicular to the cylindrical axis, there is a focal error corresponding to the whole cylindrical power. That focal error produces appreciable blurring of each individual component image parallel to line 108A.

However, such distortion of the individual component images does not significantly affect measurement of the apparent image magnification in each of the selected meridians 110, 111 and 112, as given by the separation of the components of each image pair. In each meridian the effective power of the test lens is given by equation (1) above. For the assumed position of the image receiving surface in FIG. 6B, the negative cylindrical component of that power represents a focal error which increases proportionally the apparent image magnification from its critical value for correct focus, which value is indicated in the figure by the diameter of the circle 109. Each image component is thereby shifted bodily from circle 109 to an ellipse, indicated typically at 109A, providing a direct quantitative measure of the effective optical power of the test lens in each selected meridian.

I claim:

1. The method of analyzing an effectively thin lens means which may be astigmatic to determine the optical power thereof in a selected meridian which may be obliquely related to the cylindrical axis of the lens means, comprising
   positioning the lens means as part of an optical system that is adapted for imaging a target and that includes means for varying the focal condition,
   said optical system being such that the lateral magnification of the target image varies with the focal condition and has, for correct focus, a predetermined critical value independent of the power of the lens means,
   providing in said optical system a target having a target pattern adapted for determining the lateral magnification of the target image in said selected meridian,
   varying the focal condition of the optical system and determining the focal condition for which the image magnification in the selected meridian has said critical value,
   and employing the so determined focal condition as a measure of the power of the lens means in said selected meridian.

2. The method according to claim 1 wherein said optical system includes an objective lens having said lens means positioned coaxially essentially at the focal plane on one side thereof.

3. The method according to claim 2 wherein one of said target and said target image is positioned optically at infinity on the other side of said objective lens.

4. The method according to claim 1, 2 or 3 wherein the effective aperture stop of said optical system is axially spaced from said lens means.

5. The method according to claim 1, 2 or 3 wherein said step of focal condition determination includes determining the image magnification for at least two predetermined focal conditions and deriving therefrom the focal condition for which the image magnification has said critical value.

6. The method of determining focal parameter values equivalent to the spherical power, the cylindrical power and the cylindrical axis of an effectively thin lens means which may be astigmatic, comprising
   measuring the optical power of the lens means in each of three distinct mutually spaced meridians which are selected without regard for the cylindrical axis of said lens means,
   said power measuring steps comprising
      positioning the lens means in an optical system adapted for imaging a target under such conditions that the lateral magnification of the target image when correctly focused in any meridian has a predetermined critical value independent of the power of the lens means,
      varying the focal condition of the optical system and determining, for each selected meridian, the focal condition for which the image magnification has said critical value,
      and employing the so determined focal conditions of the optical system as measures of the respective powers of the lens means,
      and deriving said parameter values from the so measured powers and their respective meridian angles.

7. The method according to claim 6 wherein said optical system includes an objective lens having said lens means positioned coaxially essentially at one focal plane thereof, and the effective aperture stop of said optical system is axially spaced from said lens means.

8. The method according to claim 6 wherein said meridians are mutually spaced by angles of substantially 60°.

9. Optical apparatus for analyzing an effectively thin astigmatic test lens means, comprising
   means for projecting light from a target pattern through an optical system including the test lens means to form a terget image,
   means for receiving the target image for discriminating image light distribution in a predetermined meridian plane, and means for varying the focal condition of the optical system,
   means for structurally defining three conditions of the optical system in which said meridian plane forms respective distinct predetermined meridian angles relative to the test lens means, and means for shifting the optical system selectively from one to another of said three conditions,
   said optical system being such that the lateral magnification of the target image varies with the focal condition and has, for correct focus, a predetermined critical value independent of the optical power of the test lens means,
   and said image receiving means including means for discriminating said critical value of the image magnification.

10. Optical apparatus according to claim 9 and including electrical means responsive to said discrimination of said critical magnification for deriving parameter values equivalent to the spherical power, the cylindrical power and the cylindrical axis of said test lens means.

11. Optical apparatus according to claim 9 wherein said optical system includes an objective lens having said test lens means substantially at a focal plane thereof.

12. Optical apparatus according to claim 9 wherein
said target pattern comprises three target components, each component being adapted for discriminating the lateral magnification parallel to one of said meridians,
said target image receiving means includes selectively actuable sensing means responsive to the respective target components,
and said meridian plane shifting means comprises means for selectively actuating one or another of the sensing means.

13. Apparatus for analyzing an effectively thin test lens means which may be astigmatic, comprising
means for projecting light from a target pattern through an optical system including the test lens means to form a target image,
and means for varying the focal condition of said optical system,
said target pattern being adapted for discriminating the lateral image magnification parallel to at least one meridian plane,
and said optical system is such that the lateral magnification of the target image varies with the focal condition and has a critical value that is indicative of correct focus,
said apparatus including means responsive to the target image and the focus varying means for discriminating said critical value of the target image magnification and thereby determining the corresponding value of the optical power of the test lens means in each of three predetermined mutually spaced meridian planes.

14. Apparatus according to claim 13 wherein
said target pattern is adapted for discriminating image light distribution in a meridian plane of response of said image responsive means,
and the test lens means is angularly shiftable relative to said target pattern and image responsive means to select among said predetermined meridian planes.

15. Apparatus according to claim 13 wherein
said test lens means comprises an eye of a human patient,
and said image responsive means includes means for positioning the eye to receive said target image.

16. Apparatus according to claim 13 wherein
said target pattern comprises three target components each adapted for discriminating image light distribution in one of said predetermined meridian planes,
and said image responsive means include three sensing means in positions to be responsive to such light distributions from the respective target components.

* * * * *